April 10, 1962 — G. T. RANDOL — 3,028,764
AUTOMOTIVE VARIABLE-DRIVE POWER TRANSMISSION
Filed Jan. 4, 1960 — 4 Sheets-Sheet 1

Inventor

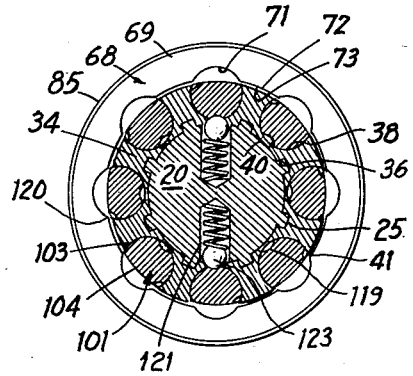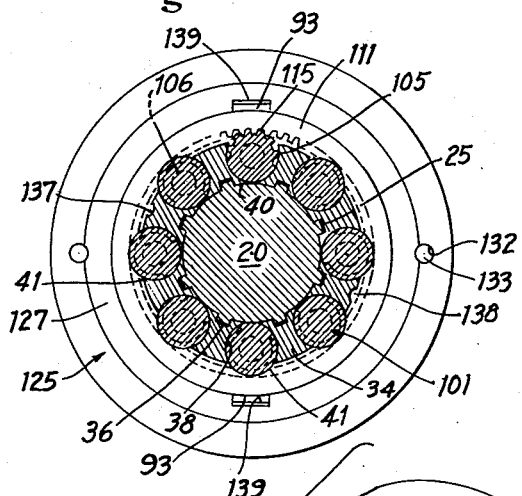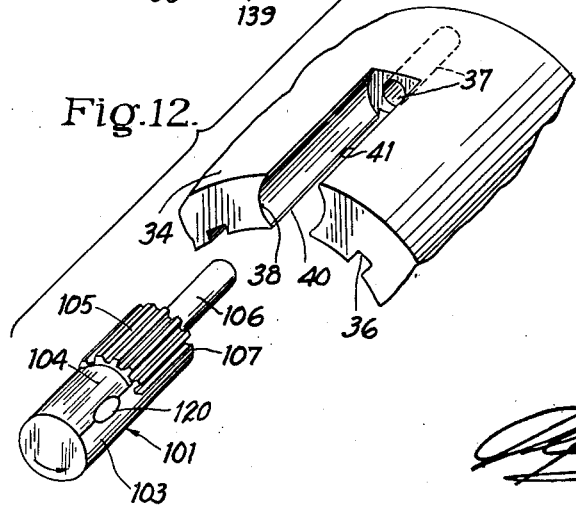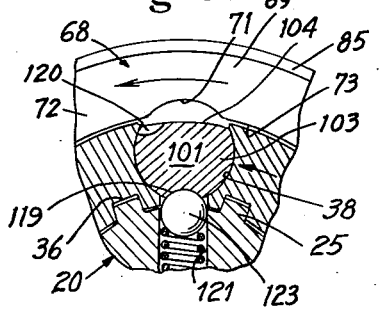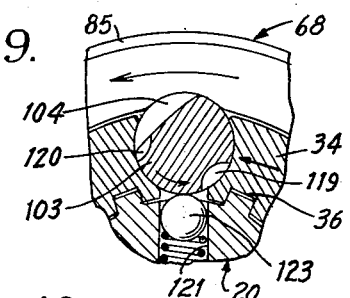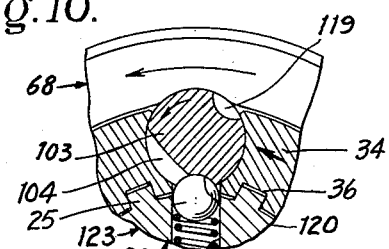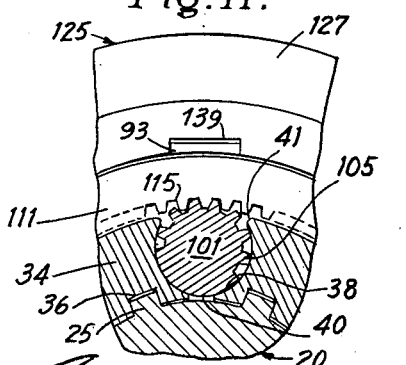

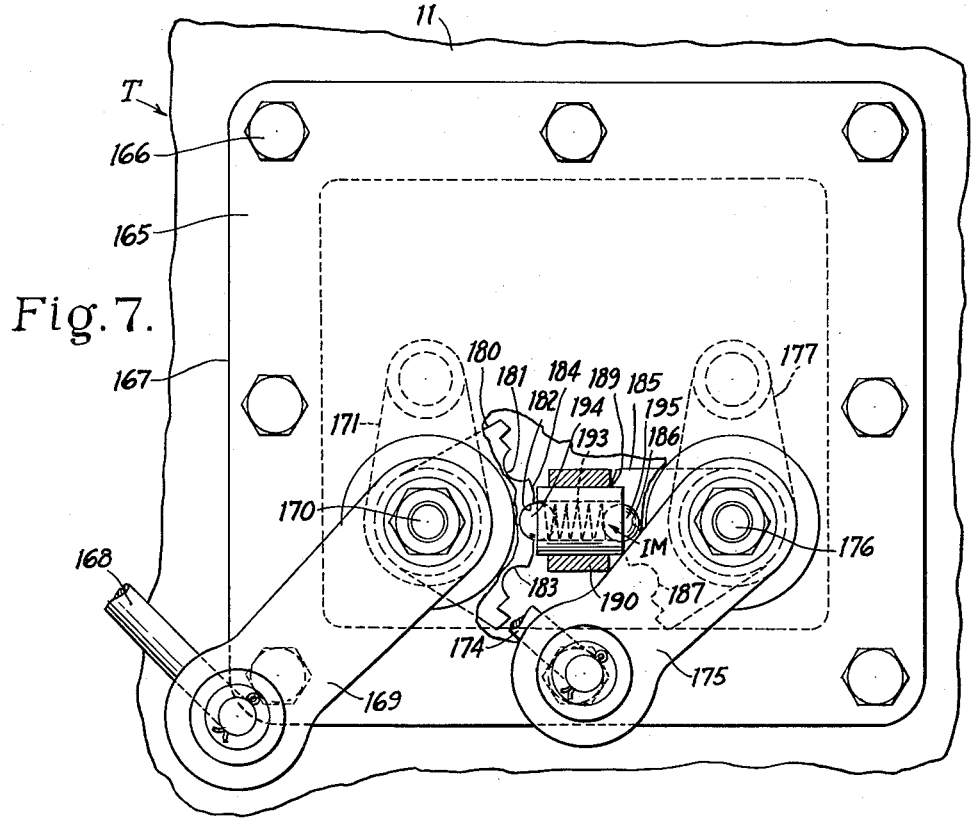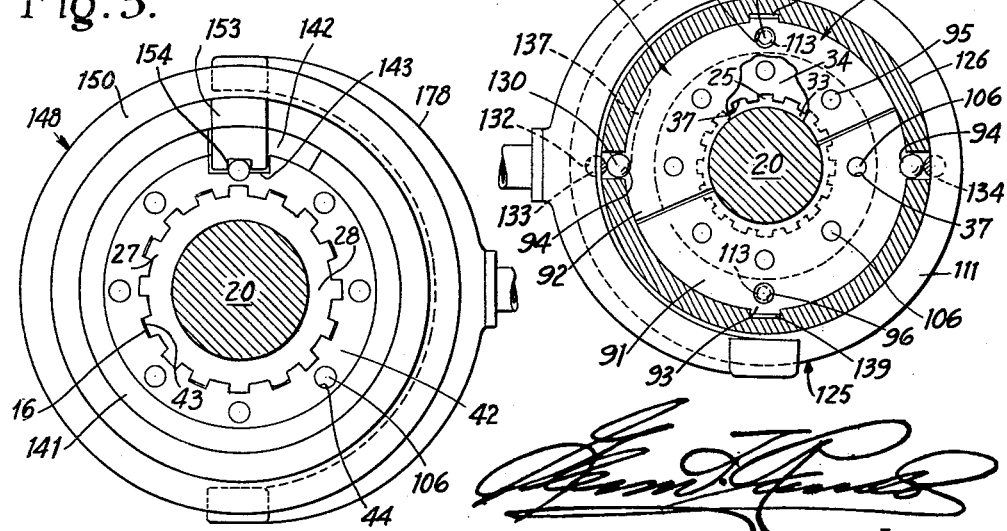

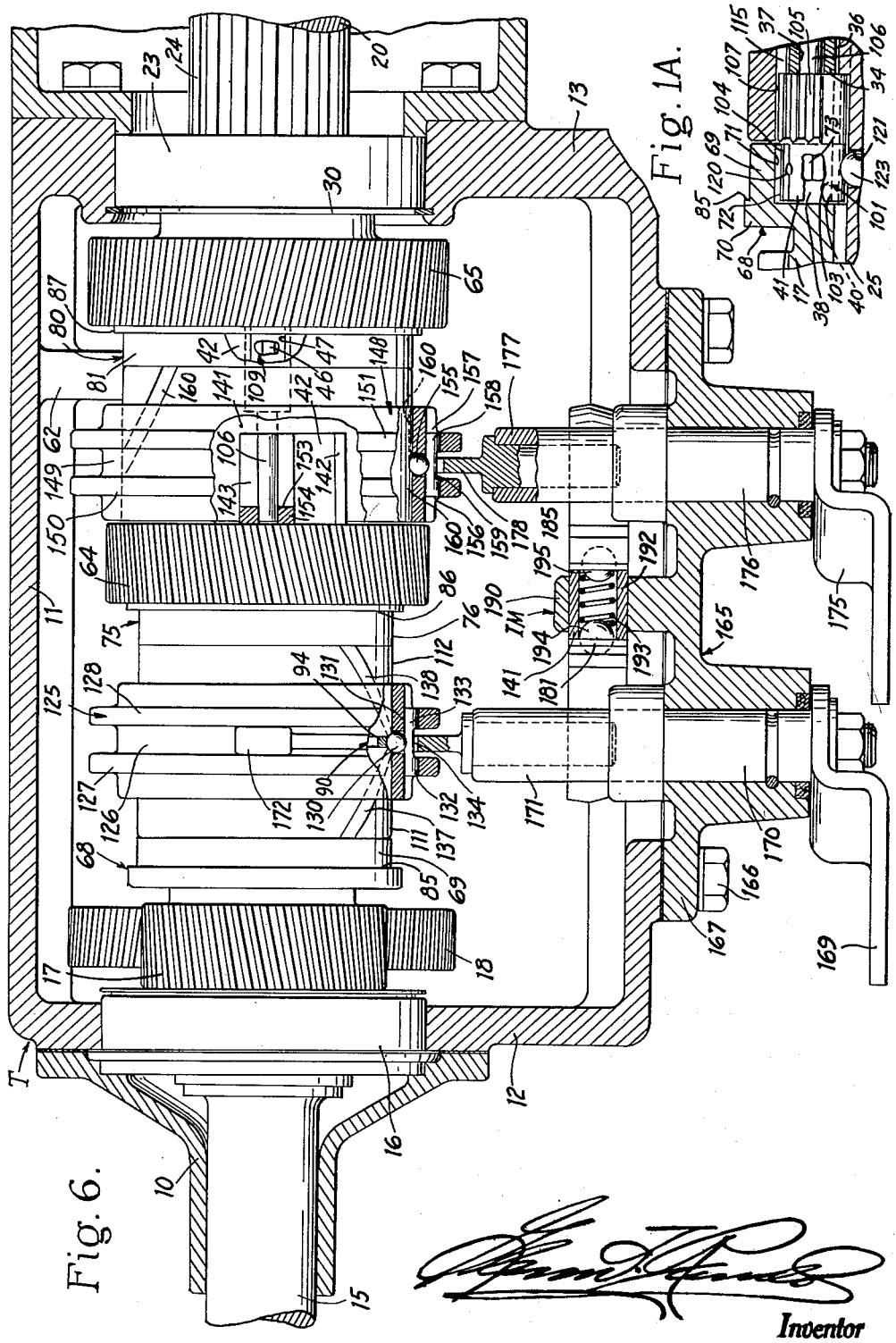

United States Patent Office 3,028,764
Patented Apr. 10, 1962

3,028,764
AUTOMOTIVE VARIABLE-DRIVE POWER
TRANSMISSION
Glenn T. Randol, 2nd Ave. and Paull St., P.O. Box 275,
Mountain Lake Park, Md.
Filed Jan. 4, 1960, Ser. No. 289
9 Claims. (Cl. 74—375)

My invention relates to power transmissions primarily intended for use on automotive vehicles and the like, although the stated field of utility is not thus restricted. More particularly, the invention is concerned with a novel change-speed transmission having an input shaft, a countershaft and an output shaft, said shafts being selectively connectible by novel positive clutch means in variant relative driving relation to produce a plurality of forward driving speeds and a reverse drive.

A primary object of my invention is to produce improved and novel self-synchronizing positive clutch means for establishing and disestablishing a selected gear ratio in response to relative and simultaneous rotation of a pair of geared elements induced by sliding movement of a third element.

Another object of my invention is to produce improved and novel positive clutch means embodying a plurality of rotatable locking elements or keys, each having a gear segment in constant mesh with another gear segment carried by an encircling rotatable sleeve member, and a locking segment engageable with a cooperating complemental recess carried respectively by two rotative elements for connecting them to rotate as a unit.

An object related to the object next preceding is to provide means on one of the rotative elements for rotatably mounting said locking elements for rotation as a unit therewith and relative thereto, said relative rotation being effective to lock the two rotative elements to rotate as a unit.

Still another obejct of my invention is to produce novel change-speed mechanism having an input shaft, a countershaft and an output shaft, said shafts carrying a plurality of gear trains in constant meshing relation, said gear trains being selectively connectible to said output shaft to produce different forward drive ratios and a reverse drive ratio by the aforementioned positive clutch means when activated by sliding movement of a shiftable member, said positive clutch means being incorporated in each of said gear trains and operable to effect quiet and positive lockup thereof to said output shaft without likelihood of damage to the relatively moving parts during such lockup operation notwithstanding a degree of torque load may be impressed on said shafts by the associated torque-producing device which, in the present instance, may be considered as an internal-combustion engine of the type employed to power motor vehicles and the like.

Another salient feature of my invention resides in the provision of novel positive interlocking means carried by said output shaft for preventing one set of locking elements from engaging their complemental recesses carried by one of the gears in one of the gear trains while another set of locking elements is engaged with their complemental recesses carried by a gear in another gear train to render the latter gear train effective to transmit drive torque to the said output shaft.

A further novel feature of my invention is provided by utilizing substantially conventional positive interlocking and yieldable detent positioning means for preventing two different gear trains from being effective at the same time and for releasably stabilizing the shiftable members in said positive clutch means in their different operating positions which in accordance with the present disclosure would correspond to "direct-drive," "low speed forward drive," "neutral" and "reverse drive."

A further important object of my invention is to produce novel and improved positive clutch means incorporating a mechanical connection between a shiftable member and a rotatable member encircled by said shiftable member adapted to convert reciprocable movement of the latter into rotational movement of the rotatable member, said means including another mechanical connection between said output shaft and shiftable member for preventing relative rotation therebetween.

Yet another object of my invention is to produce a change-speed drive of the type above referred to, which is controllable by either manual- and/or power-shifting mechanism, and which may be readily incorporated in motor vehicles or the like to replace the commonly known synchro-mesh gearbox or automatic transmissions of the hydraulic type currently in production.

Other objects and advantages of my invention will become apparent by reference to the following detailed description taken in connection with the accompanying drawing wherein like reference characters designate identical parts and assemblies in the several views in which:

FIGURE 1A is a fragmentary portion of FIGURE 1 on an enlarged scale in the area of one of the rotatable clutch elements to clarify details thereof, said elements being adapted to activate and de-activate direct-drive;

FIGURE 2 is a transverse section taken along the line 2—2 of FIGURE 1 showing details of the locking segments terminating one end of the rotatable locking elements and complemental recesses engageable thereby to lock the direct-drive gear train to the output shaft;

FIGURE 3 is another transverse section taken along the line 3—3 of FIGURE 1 showing details of the gear segments carried by each of the clutch elements, which are constantly meshed with an internal gear segment carried by a rotatable member for activating and inactivating direct-drive;

FIGURE 4 is another transverse section taken along the line 4—4 of FIGURE 1 showing details of the novel positive interlocking mechanism incorporated between the two sets of rotatable clutch elements, one set effecting direct-drive and the other set for establishing low-speed forward drive;

FIGURE 5 is another transverse section taken along the line 5—5 of FIGURE 1 showing details of the slidable connection between the reverse drive shiftable member and driven shaft;

FIGURE 6 is a longitudinal horizontal section of my power transmission with portions broken away to show details of the shifting mechanism for controlling the two shiftable members to their different operating positions;

FIGURE 7 is a fragmentary portion of a side elevation of my power transmission showing the detachable cover on which is mounted said shifting mechanism and the exterior levers and linkage to operate the same;

FIGURES 8, 9 and 10 are fragmentary transverse sections on an enlarged scale depicting the engaging sequence of one of the locking segments with a cooperating gear recess;

FIGURE 11 is a fragmentary view on an enlarged scale of FIGURE 3 corresponding to the scale of FIGURE 8 to clarify the gear drive between one of the rotatable sleeve members and clutch elements rotated thereby; and FIGURE 12 is an exploded view in perspective showing a fragmentary portion of one of the clutch element carriers and associated rotatable clutch element carried thereby.

Figure 1:
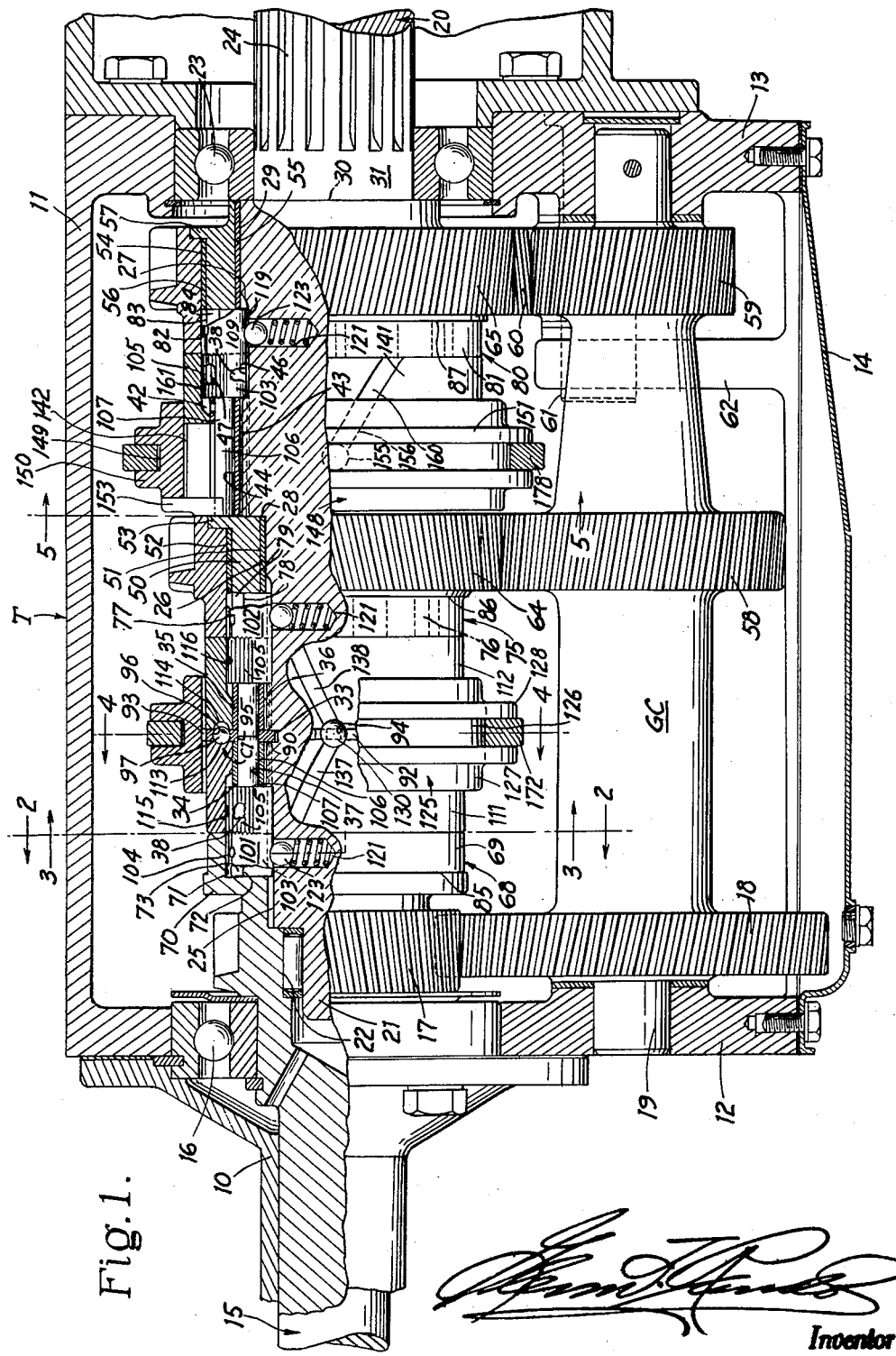
FIGURE 1 is a longitudinal vertical section of a power transmission embodying the principles of my invention with the parts shown in "neutral" condition.

Referring now to the drawing wherein a preferred embodiment of my novel change-speed transmission or torque-changing drive is illustrated, and with particular reference to FIGURES 1–4 inclusive, the letter character "T" will be used throughout the several views to generally designate this variable-drive unit and which comprises: a forwardly extending bell-shaped housing shown fragmentarily at 10 and a rearwardly projecting housing 11 integral with said housing 10 is provided with front and rear end walls 12, 13 respectively, an open bottom and a side opening, and a removable cover 14 is provided for the open bottom and formed as a reservoir with a drain plug for the transmission lubricant.

A driving or input shaft 15 which has the usual friction clutch and/or fluid drive connection to a prime mover such as an internal-combustion engine (not shown), said connection being enclosed by said forwardly extending housing 10 which is attached to the block of the engine, is journaled at 16 in the front wall 12 of the transmission housing, and fast on its inner end is a driving gear 17. This gear is in constant meshing relation with a gear 18 of a gear-cluster generally designated "GC" rotatably mounted on a countershaft 19 fixedly supported at each end by and spanning the space between said end walls 12, 13 respectively within said housing 11 preferably to one side and spaced below an imaginary line vertically intersecting the axis of said driving shaft.

A driven or output shaft 20 is coaxially piloted at its forward end 21 in a bearing recess 22 provided in the driving gear 17, and the opposite end thereof is journaled at 23 in the rear end wall 13 and projects to the exterior of said wall in a terminating externally splined portion 24 for connection to the vehicle propeller shaft (not shown) via a conventional universal joint (not shown). A splined surface portion 25 is provided with a plurality of circumferentially spaced longitudinal splines which extend rearwardly on said driven shaft 20 from its piloted end to merge with a smooth surface portion 26 of the same diameter as an imaginary circle defining the major diameter of said splined portion. Another splined surface portion 27 of larger diameter than portion 25 is provided with a plurality of circumferentially spaced longitudinal splines which extend rearwardly from the said smooth portion 26 to form therewith an external annular shoulder 28. The splined portion 27 merges with a smooth surface portion 29 of the same diameter as an imaginary circle defining the major diameter of said last-mentioned splined portion. The smooth portion 29 extends to the inner face of the bearing 23 to form an external annular shoulder at 30 with a reduced diameter smooth surface portion 31 which projects through said bearing to the exterior of said rear end wall for splined connection with the vehicle propeller shaft (not shown) as aforestated.

The splined portion 25 is medially channeled circularly at 33 to a depth greater than an imaginary circle defining the minor diameter of said grooved portion for an important purpose to appear.

Mounted on the splined portion 25 is a pair of identical collar-like cages or carriers 34, 35 having their inner cylindrical surfaces provided with a like number of grooves 36 to engage the splines in said portion 25, one on each side of said channel 33 and each of said carriers being provided with a plurality (preferably eight in number) of longitudinal bores 37, said bores being circumferentially equally spaced with their axes radially spaced parallelly to the axis of said driven shaft 20 when the carriers are installed in operating position on said shaft for co-rotation therewith with their respective longitudinal bores coaxially disposed.

Opposite ends of each pair of aligned longitudinal bores 37 terminate in identical counterbores 38, and the inner and outer wall portions of the carriers which encircle said counterbores are slotted longitudinally at 40, 41 to provide inner and outer diametrically opposed openings adapted to connect the interior and exterior respectively of said cages with the interior of said counterbores. These openings are disposed on an imaginary radial line intersecting the axis of said driven shaft, said openings being adapted to serve an important purpose as will appear.

Mounted on the splined portion 27 is another collar-like carrier 42 having its inner cylindrical surface similarly grooved at 43 to engage the splines in said portion 27, said carrier being provided with a plurality (preferably eight in number) of longitudinal bores 44, said bores being circumferentially equally spaced with their axes radially spaced parallelly to the axis of said driven shaft 20 when the carrier 42 is installed in operating position on said shaft for corotation therewith.

The outer ends of the longitudinal bores 44 terminate in counterbores identical to counterbores 38, and the inner and outer wall portions of the carrier 42 encircling said counterbores are slotted longitudinally at 46, 47 to provide inner and outer diametrically opposed openings to connect the interior and exterior respectively of said carrier with the interior of said counterbores. These openings are disposed on an imaginary radial line intersecting the axis of said driven shaft, said openings being adapted to serve an important purpose as will appear.

It is important to note here that the grooved inner surfaces 36, 43 on the carriers 34, 35 and 42 preferably are provided with sixteen (16) grooves to engage a corresponding number of splines forming each of the splined portions 25, 27. In machining the eight (8) counterbores aforesaid, the inner openings (slots) 40, 46 through the walls of the associated carriers are formed since that portion of the wall of the carrier is removed leaving intact only that portion of each of the eight (8) grooves aforesaid that is coextensive with each of the longitudinal bores best demonstrated in FIGURE 1. Accordingly, each of the carriers aforesaid is provided with eight (8) internal grooves coextensive with said carriers and eight (8) shorter internal grooves coextensive only with the longitudinal bores (see FIGURE 12 perspective). Therefore, it is seen that the inner openings 40, 46 coextensive with said counterbores 38 result from the processing of the counterbores and which serve an additional purpose as will appear.

Rotatably mounted on the smooth portion 26 of the driven shaft 20 is a ring-like bearing 50 provided with internal and external pressfitted bushings 51, 52 respectively, said bearing terminating at its right end to an outstanding circular flange 53; and another ring-like bearing 54 of larger diameter than bearing 50, is provided with internal and external pressfitted bushings 55, 56 respectively and rotatably mounted on the smooth portion 29, said latter-mentioned bearing being provided with an outstanding circular flange 57 disposed flush with the right side thereof.

Constantly meshing gears 17, 18 provide a drive connection for the aforesaid gear-cluster GC which additionally includes a low speed gear 58 and a reverse drive gear 59, the latter gear being drivingly connected at all times with an idler gear 60 which rotates on its own shaft 61 fixed at one end on the rear end wall 13 of the transmission housing with the other end supported in a projection 62 integral with the transmission housing wall.

Rotatably mounted on said bearing 50 is a low-speed gear 64 which is maintained in circular alignment with its constantly meshing gear 58 by said bearing flange 53 to produce what may be termed a forward low-speed drive gearset or gear train, and rotatably mounted on the bearing 54 is a reverse drive gear 65 which is maintained in circular alignment with its constantly meshing idler gear 60 to form with gear 59 what may be termed a reverse drive gearset or gear train. The bearings 50, 54 which, as previously noted, are circularly flanged at 53, 57 respectively to receive axial thrust from the gears 64 and 65 respectively rotatably mounted thereon, thus serving to maintain these gears in alignment with their mating gears on the gear-cluster GC. These bearings also serve to facilitate assembly of the gears and associated parts carried by the driven shaft 20.

The gear 17 carries a coaxial cup-shaped clutch member 68 having a cylindrical wall 69 integral with the end wall 70, said cylindrical wall being provided with a plurality (eight) of arcuate recesses 71 interconnected by lands 72 formed with arcuate faces 73 which define the interior surface of said cylindrical wall. Similarly, the gear 64 is provided on the side confronting said clutch member 68 with a coaxial clutch member 75 longitudinally spaced from the clutch member 68, and which is provided with a cylindrical wall 76 having a plurality (eight) of arcuate recesses 77 interconnected by lands 78 formed with arcuate faces 79 defining the interior surface of said last-named cylindrical wall. Gear 65 is also provided on the side confronting gear 64 with a clutch member 80 provided with a cylindrical wall 81 having a plurality (eight) of arcuate recesses 82 interconnected by lands 83 formed with opposite arcuate faces 84 defining the interior surface of said cylindrical wall 81.

The exterior surfaces of the cylindrical walls 69, 76, 81 of the clutch members 68, 75 and 80 respectively are provided with annular shoulders or abutments 85, 86 and 87 respectively to serve as limiting means as will appear.

Positive interlocking means carried by said driven shaft 20 between the clutch members 68, 75 are generally designated "CI" and comprise: a ring-like member 90 formed of two semicircular sections 91, 92 engaging said annular groove 33. A pair of diametrically opposed outstanding lugs or splines 93 and a pair of indentations 94, are provided on the medial outer curved surface of each of said semicircular sections, one on each section, and a plurality of holes 95 are provided in circular alignment through said member 90, four in each of said sections corresponding to and in registry with the eight longitudinal bores 37, and radially spaced outwardly in diametrically opposed relation with respect to said holes 95 are two detent holes 96, one in each section aforesaid, and a preferably spherical (ball) element 97 is movably carried in each of said holes 96 to serve a positive locking function to be more fully described hereinafter.

Two sets of eight each clutch elements 101, 102 are rotatably mounted in the aforesaid counterbores 38, 39 respectively and interconnecting longitudinal bores 37, and each of said clutch elements comprises: a locking segment 103, an indented arcuate unlocking portion 104 opposite lateral edges of which define a leading edge and a trailing edge at the point of mergence with the locking segment, a gear segment 105, and a reduced diameter cylindrical stem 106 defining an external annular shoulder at 107 with said gear segment, said stem being rotatably supported in said longitudinal bore 37, and said locking and gear segments being rotatably supported in said counterbores 38, 39 with the gear segments exposed above the exterior cylindrical surface of the carriers 34, 35 through said openings 41. As best demonstrated in FIGURES 1 and 8, a pair of opposed clutch elements is carried by each of said longitudinal bores and the terminating counter bores thereof with the confronting ends of the stems 106 projecting through the holes 95 in the interlocking member 90 into abutting relation. This extension of the stems 106 through the holes 95 stabilizes the interlocking member 90 for co-rotation with the driven shaft 20 and also accommodates relatively rotation of said clutch elements with respect to said driven shaft.

The clutch unlocking portions 104 carried by the circularly aligned set of clutch elements 101 define an imaginary circle of slightly less diameter than a similar circle defined by said arcuate land faces 73 when said unlocking portions 104 are disengaged from their complemental recesses 71 interconected by said lands (see FIGURES 1 and 8). The aforesaid locking segments 103 and unlocking portions 104 thereon and the complemental recesses engaged thereby may be termed a "torque-transmitting connection" for convenience in describing this novel positive clutch structure to distinguish the latter from its associated gearset or train 17, 18. This connection when engaged provides a two-way direct-drive from the driving shaft 15 to the driven shaft 20.

In a similar manner to that described immediately preceding, the clutch unlocking portions 104 carried by the circularly aligned clutch elements 102 define an imaginary circle of slightly less diameter than a similar circle defined by the arcuate land faces 79 on the lands 78 when said portions 104 are disengaged from their complemental recesses 77 interconnected by said lands. The aforesaid locking segments and locking portions thereon and the complemental recesses engaged thereby are also termed a "torque-transmitting connection" for convenience in describing this novel positive clutch structure to distinguish the latter from its associated gearset or train 64, 58. This connection when engaged provides low speed forward drive between the driving shaft 15, gear-cluster GC and driven shaft 20.

Referring now to the reverse drive gearset or train 59, 60, 65, it will be observed on reference to FIGURE 1 that circularly aligned recesses 82 and interconnecting lands 83 having said arcuate faces 84 define an imaginary circle of slightly greater diameter than a similar circle defined by the arcuate unlocking portions 104 on the locking segments 103 of a set of rotatable clutch elements 109 of identical construction to clutch elements 101, 102, when said unlocking portions are disengaged from their complemental recesses 82 interconnected by said lands. The clutch elements 109 are provided with the aforesaid gear segments 105 shouldered at 107 to produce the reduced diameter stem 106, the latter being rotatably mounted in the bores 44 and the gear and locking segments thereof being rotatably supported in the counterbores 45 with the gear segments being exposed through the elongated openings 47. The aforesaid locking segments and unlocking portions thereon and the complemental recesses engaged thereby provide what may be termed another "torque-transmitting connection" for convenience in describing this novel positive clutch structure to distinguish the latter from its associated gear set or train 59, 60, 65. This connection when engaged provides reverse drive between the driving shaft 15, gear-cluster GC, idler gear 60 and driven shaft 20.

Reference is again made to the splined portions 25 and 27 wherein it will be noted that the sixteen (16) splines of each portion are arranged in alternate long and short splines, the eight (8) long splines being coextensive with the carriers 34, 35 and 42, and the eight (8) short splines being coextensive with the longitudinal bores 37 in said carriers whereby operating clearance is provided for the rotatable clutch elements with respect to the minor diameters of the driven shaft 20 at said splined portions.

A pair of cylindrical sleeve members 111, 112 is rotatably mounted on the said carriers 34, 35 respectively, member 111 being disposed between the forward peripheral marginal side of said interlocking member 90 and the confronting end of the cylindrical wall 69, and the other member 112 being confined between the opposite (rear) peripheral marginal side of said interlocking member 90 and the confronting end of said cylindrical wall 76. Normally in registry with the two holes 96 of the interlocking member 90, are two confronting depressions 113, 114, one on each side of the member 90 in the confronting ends of the sleeve members 111, 112 respectively, said depressions being normally partially engaged simultaneously by the detent element 97 when both of said members 111, 112 are in "neutral" position as shown in FIGURE 1 wherein the locking segments on the clutch elements 101 and 102 are disengaged from their complemental recesses 71 and 77 respectively. Upon relative rotation of one sleeve member with respect to the other, the depression in the one sleeve member will force the detent element 97 into full engagement with the depression in the other sleeve member to lock the latter member in its "neutral" position while the one sleeve member is in its drive establishing position. Each of the sleeve members 111, 112 is capable of relative rotation with respect to each other, and to the driven shaft 20, and also co-rotational with the latter shaft, said sleeve members being provided at their outer opposite ends with internal annular gear segments 115, 116 respectively in constant meshing relation with the gear segments on the clutch elements 101, 102 respectively whereby rotational movement of each sleeve imparts relative rotation to the set of clutch elements geared thereto.

Two circumferentially spaced depressions 119, 120 are provided in the cylindrical surface of each of the locking segments on a selected pair of diametrically opposed clutch elements in each set of eight clutch elements 101, 102 respectively. Two pairs of diametrically opposed blind bores 121 are provided in the splined portion of the driven shaft 20, each of these bores receives a spring-loaded ball 123 in alignment with the circular path of said depressions when said clutch elements are rotated from neutral (unlocked) to engaged (locked) condition defined by the two depressions 119, 120 respectively as shown in FIGURES 8 and 10 respectively. Accordingly, these two pairs of spring-loaded detents 123 are engageable with the depressions 119, 120 to releasably stabilize the sets of clutch elements 101, 102 and gear connected sleeve members 111, 112 respectively in their "neutral" and selective "operating" positions corresponding to direct-drive and low speed forward drive. As best demonstrated in FIGURE 1 there are two pairs of detents 123 provided for the two sets of clutch elements 101, 102, to control the remaining six elements comprising each set and their respective gear connected sleeve members to thus releasably establish the locking segments on each set of clutch elements in their "neutral" positions and drive activated "operating" positions aforesaid.

Slidably mounted on the sleeve members 111, 112 is a collar-like slidable member 125 provided with an external annular groove 126 defined by lateral circular flanges 127, 128, opposite ends of the collar member being adapted to abut the shoulder stops 85, 86 respectively when the sleeve members are selectively rotated relatively to engage the locking segments on the activated set of clutch elements with their complemental recesses. A pair of diametrically opposed balls 130 partially engage a pair of correspondingly disposed holes 131 through the cylindrical bottom wall portion of the groove 126, to expose approximately one-third of each ball beyond the inner smooth cylindrical surface of the slidable member 125. A transverse hole 132 passes through the groove flanges 127, 128 aforesaid and intersects said groove and each of said holes 131. A round pin 133 having a central transverse slot 134 is pressfitted into each of said holes 132 with the slot 134 equal in width to the said groove with the bottom of the slot flush with the bottom of the groove. The rounded side of each of said pins opposite the slot therein engages the balls to prevent radial displacement outwardly thereof from their respective holes 131 thereby stabilizing said balls in the holes 131 with approximately one-third exposure with respect to the inner cylindrical surface of the slidable member 125.

The exposed portion on each of said balls 130 is adapted to selectively engage complemental raceways 137, 138 diametrically positioned in the exterior cylindrical surface of said sleeve member 111, 112 respectively, said raceways angularly radiating from the aforesaid indentations 94 formed in the outer face of the interlocking member 90, the balls normally lying in said indentations when both sleeve members 111, 112 are in their respective normal neutral positions and the slidable member 125 centrally disposed as shown in FIGURE 1. A pair of diametrically opposed longitudinal grooves 139 is provided in the inner cylindrical surface of said slidable member 125, said grooves being engaged by the splines 93 to provide co-rotation of the slidable member 125 and driven shaft 20 while accommodating relative sliding movement of the slidable member with respect to the sleeve members 111, 112 and to the driven shaft 20. Accordingly, when the slidable member 125 is moved from its neutral position shown in FIGURE 1, the ball and raceway connections convert sliding movement of said member 125 into rotary movement of the selected sleeve member 111, 112 which in turn rotates the connected clutch elements 101, 102 respectively through the gear connections therebetween, to rotate the locking segments on the actuated set of clutch elements into engagement with their complemental recesses to establish the selected drive.

A cylindrical sleeve member 141 is rotatably mounted on the carrier 42 between the rear face of gear 64 and the confronting end of the cylindrical wall 81 integral with gear 65. This sleeve member is provided with a cutout at 142 which is circularly aligned with a narrower cutout 143 in the corresponding end of the carrier 42, said narrow cutout being adapted to expose an end portion of one of the clutch element stems 106, the purpose of this structure will be explained in detail later.

A pair of circumferentially spaced depressions 119, 120 identical to those incorporated in the locking segments of the clutch elements 101, 102 are provided in the cylindrical surface of two diametrically positioned locking segments 103 of the reverse drive set of clutch elements 109 as shown in FIGURE 1. A third pair of diametrically opposed blind holes 121 are provided in the splined portion 27 of the driven shaft 20 and each of these holes receives the aforesaid spring-loaded ball 123 disposed in alignment with the circular path of movement of said depressions 119, 120 and selectively engageable therewith to releasably stabilize the set of eight reverse drive clutch elements 109 and gear connected sleeve member 141 in neutral position wherein said locking segments are disengaged from their complemental recesses 82, and in reverse drive position wherein said locking segments 103 are engaged with their recesses aforesaid as demonstrated in FIGURE 10 to establish reverse drive.

Slidably mounted on said sleeve member 141 is a collar-like slidable member 148 provided with an external annular groove 149 defined by lateral circular flanges 150, 151, opposite ends of the latter member being abuttable respectively with the gear 64 to establish neutral condition of the clutch elements 109 best demonstrated in FIGURE 1, and with the circular stop shoulder 87 on said gear 65 when reverse drive is established. Sliding movement of the member 148 is controlled by a member 153 projecting through said registering cutouts 142, 143, inwardly radially from the flange 150 with its free end 154 bifurcated to straddle mount on one of the clutch element stems 106 whereby the slidable member 148 is slidable relatively to said driven shaft 20 and interposed sleeve member 141 and co-rotational therewith.

A pair of diametrically opposed balls 155 partially engage a pair of correspondingly disposed holes 156 through the cylindrical bottom wall of the groove 149, to expose approximately one-third of each ball beyond the inner smooth cylindrical surface of the slidable member 148. A transverse hole 157 passes through the groove flanges 150, 151 aforesaid and intersects said groove and each of said holes 156. A round pin 158 having a central transverse slot 159 is pressfitted into each of the holes 157 with the slot 159 equal in width to the said groove with the bottom of said slot flush with the bottom of said groove. The rounded side of said pin opposite the slot therein engages the balls to prevent radial displacement outwardly thereof from their respective holes 156 thereby stabilizing said balls in the holes 156 with approximately one-third exposure with respect to the inner cylindrical surface of the slidable member 148. The exposed portion of each of said balls is adapted to engage a pair of diametrically opposed complemental angular raceways 160 which radiate from the left end of said cylindrical sleeve member 141 in the exterior cylindrical surface thereof to provide a mechanical connection therebetween whereby sliding movement of the slidable member 148 imparts rotary movement to said sleeve member 141, the latter having an internal gear segment 161 in constant mesh with the gear segments 105 on the clutch elements 109, to effect relative rotational movement of the clutch elements 109 to engage and disengage their locking segments 103 with respect to their cooperating recesses 82 to place the reverse drive gearset in activated and neutral conditions respectively.

A detachable cover 165 is provided for the side opening in the transmission housing 11 and secured thereto by a plurality of cap screws 166 projecting through a marginal flange 167 on said cover. A connecting rod 168 is connected to an exterior rocker arm 169 that rocks a stud shaft 170 journaled transversely through the cover with a crank 171 fixed on its inner end. This crank has a shifting fork 172 journaled at one end parallel to said stud shaft, the other bifurcated end of said fork being adapted to engage the external annular groove 126 in the slidable member 125 to move it forwardly to effect direct-drive and to move it rearwardly to effect low speed forward drive from a common central neutral position as best demonstrated in FIGURE 1. Another connecting rod 174 is similarly connected to an external rocker arm 175 fast on a stud shaft 176 journaled transversely in rearwardly spaced relation from the shaft 170, through the cover 165, to which is also fixed an internal crank 177 having a shifting fork 178 journaled at one end parallel to said shaft 176, said last-named fork having a bifurcated free end engaging the annular external groove 149 in the shiftable member 148 to move it from neutral position shown in FIGURE 1 to reverse drive position to activate reverse drive. Rods 168, 174 are connected to a manual shift actuator (not shown) usually mounted on the vehicle steering column, to selectively rock the rocker arms 169, 175 respectively and thereby establish the selected drive as is understood.

The cover 165 includes a selector interlocking mechanism generally indicated at "IM," of conventional construction and operation, although it will be understood that other interlocking mechanisms are familiar in the art. Internal crank 171 is provided with a more or less arcuate flange 180. This flange preferably has three arcuate notches 181, 182 and 183. As indicated, the edge wall portions adjacent notch 182 flattened at 184 so that they extend out radially a shorter distance than the normal arcuate edge walls adjacent the other two notches.

The other internal crank 177 has a similar arcuate flange 185 on it with the edge wall portion thereof confronting the edge walls on the other flange. Flange 185 is indented with two circumferentially spaced arcuate notches 186, 187 with adjacent marginal edge portions on opposite sides of notch 186 being flattened at 189 in parallelism with the flats 184 when notches 182, 186 are in confronting alignment corresponding to "neutral" gear condition.

A block 190 is carried on the inside of the cover between said confronting wall edges of the flanges 180, 185, said block being provided with a longitudinally bore 191 co-extensive therewith which slidably supports a sleeve 192 in which there is a normally preloaded compression spring 193 reacting between two balls 194, 195 to separate them, as indicated. The balls normally engaged respectively the notches 182, 186. The sleeve 193 is of less length than the distance between the flattened surfaces adjacent notches 182, 186 but precisely fits between the arcuate wall edges of the flanges 180, 185 and opposed flattened portion when either of the shifting forks 172, 178 is moved from neutral position to a drive activating position to thus lock the other shifting fork in its neutral position to prevent simultaneous attempted engagement of two different drives. Accordingly, when the sleeve 192 is between the arcuate edge walls of either notch 181 or 183 and flattened surfaces adjacent notch 186, slidable member 148 is locked in neutral position shown in FIGURE 1 but when the sleeve 192 is between the flattened surfaces adjacent notch 182 and the arcuate surfaces adjacent notch 187, the slidable member 125 is locked in its central neutral position as shown in FIGURE 1, but when notches 182, 186 are aligned to receive the two balls respectively, slight lost-motion is restored to the sleeve 192 between the opposed flattened surfaces adjacent said two notches.

With this arrangement, when both shafts 170, 176 are in neutral position, either shaft may be rocked from such position in the selected direction to activate the drive controlled by the connected shifting fork and associated slidable member 125 or 148. But, after either of said members has been shifted from its neutral position, the sleeve 192 is caused to snugly engage the flat portions adjacent the neutral notch on the member in neutral position and thereby prevent its movement at all until the shifted slidable member has been returned to its neutral position. The only movement provided in this case is the return of the shifted member to neutral, after which either slidable member may be shifted, although only one member may be shifted at a time from neutral.

The spring urged balls 194, 195 engaging the various notches aforesaid serve to releasably stabilize the slidable members 125, 148 in their different drive operating positions and neutral to prevent fortuitous movement therefrom until a speed-change or neutral is deliberately effected either by the operator or by automatic means.

*Operation*

The manner in which my improved torque-changing mechanism T operates is believed manifest from the foregoing description. However, in the interest of further clarifications, a more detailed consideration will be given to its operational cycles as follows:

Driving torque will in all gear ratios drives be supplied from a source of power such as an internal-combustion engine (not shown) to driving shaft 15 whence it will pass to driving gear 17 to gear 18 to drive the cluster of gears GC rotatably mounted on the countershaft 19. Under these circumstances, since the torque-transmitting connections associated with the different gearsets are disengaged, the transmission T is in neutral condition as shown in FIGURE 1 wherein the driving shaft 15 and gear-cluster GC are idling, and for purposes of description the vehicle may be assumed to be motionless since under these conditions torque cannot be impressed on the output shaft 20.

If low speed forward drive is desired activated, shiftable member 125 is moved rearwardly from its central-neutral position shown in FIGURE 1, such movement being achieved by applying manual effort thereto through the aforesaid rod 168 and connected rocker arm 169, shaft 170, crank 171 and shifting fork 172 to bring the member 125 into abutting relation with the shoulder 86. This sliding movement of the member 125 is converted into a counterclockwise rotational movement from the driver's viewpoint to the sleeve member 112 by the aforesaid ball and raceway connections 130, 138 to produce an engaging sequence of the locking segments 103 on the set of clutch elements 102 with their complemental recesses 77 corresponding to FIGURES 8, 9 and 10 to thus lock the low-speed gear 64 to the driven shaft 20 whereby this torque-transmitting connection is effective to transmit drive torque from the driving gear 17, cluster gears 18 and 58 to gear 64 thence to said driven shaft to drive the vehicle propeller shaft (not shown).

During this engaging sequence of the low-speed forward drive, it should be importantly observed that the interlocking detent element 97 has been moved by the camming action of depression 114 in sleeve member 112 into full engagement with the depression 113 in the other sleeve member 111 to lock the latter in neutral position, and the yieldable positioning ball 123 is now engaging the depression 120 to releasably hold the set of clutch elements 102 in clutch lockup position and the gear connected sleeve member 112 in its corresponding rotated position from central-neutral position.

While low-speed forward drive is active, the arcuate unlocking segments 104 on the set of clutch elements 101 describe an imaginary circle and so held interlocking by the detent 97 engaged in depression 113, out of engagement with the recesses 71 and therefore their interconnecting lands 72.

If direct-drive is now desired activated, the shiftable member 125 would be moved to its opposite extreme position by manual movement of the rod 168 and connected shifting parts aforesaid through its central-neutral position to place the shiftable member in abutting relation with respect to the stop shoulder 85. During this transition from low-speed to direct-drive, the ball and raceway connections 130, 138 would rotate the sleeve member 112 in a clockwise direction to its neutral position shown in FIGURE 1, and therefore the locking segments 103 on the set of clutch elements 102 geared to said sleeve member would be disengaged from their cooperating recesses 77 to again present their arcuate faces on the unlocking portions 104 on an imaginary circle, and the interlocking detents 97 again moved through the identations 94 to engage the balls and raceway connections 130, 137 to rotate the sleeve member 111 counterclockwise to produce an engaging sequence of the locking elements 103 on the set of clutch elements 101 with their cooperating recesses 71 corresponding to FIGURES 8, 9 and 10 to thus lock the driving shaft 15 directly to the driven shaft 20, whereby this torque-transmitting connection is effective to transmit drive torque from the driving gear 17 to the driven shaft 20 to drive the vehicle propeller shaft (not shown) at 1 to 1 ratio while the gear-cluster GC idles.

During this disengaging sequence of low-speed forward drive and engaging sequence of direct-drive, it is important to note that the interlocking detent 97 of the interlocking means CI was moved by the camming action of depression 113 in sleeve member 111 out of engagement therewith into full engagement with the depression 114 in the neutralized sleeve member 112 to lock the latter in that position with the yieldable positioning detent 123 now engaging the depression 119 to releasably hold the set of clutch elements 102 and the gear connected sleeve member 112 in central-neutral position; while the positioning detents 123 associated with the locking segments 103 of the set of clutch elements 101 have been moved out of engagement with depressions 119 into engagement with depressions 120 carried thereby.

This completes what may be termed a forwarding driving cycle of activating the low-speed drive and the direct-drive from their respective neutral positions demonstrated in FIGURE 1. To deactivate the direct-drive and thus place the shiftable member 125 in its central-neutral position, the sleeve members 111 would be rotated clockwise from the driver's viewpoint which rotational movement would reverse the rotational movement of the set of clutch elements 101 through the gear connection therebetween to again place the arcuate surfaces of the unlocking portions 104 on an imaginary circle which disposes the locking segments 103 out of engagement with their complemental recesses 71 and the positioning detents 123 in engagement with the depressions 119 carried by said locking segments to stabilize the sleeve member and gear connected clutch elements 101 in their respective neutral positions in readiness for another activating cycle through the forward driving speeds.

In a similar manner, if reverse drive is desired activated, the shiftable member 148 would be moved rearwardly from its neutral position shown in FIGURE 1 with the other shiftable member 125 locked in its central-neutral position, wherein the flange 150 on the member 148 abuts the gear 64, to its extreme opposite position adjacent gear 65 wherein the latter member abuts the shoulder 87. Such movement of the member 148 being achieved by applying manual effort thereto through the aforesaid rod 174 and connected rocker arm 175, shaft 176, crank 177 and shifting fork 178. This sliding movement of the sleeve member 148 is converted into a clockwise rotational movement from the driver's viewpoint to the sleeve member 141 by the aforesaid ball and raceway connections 155, 160 to produce an engaging sequence opposite to that shown by the arrows on FIGURES 8, 9 and 10 of the locking segments 103 on the set of clutch elements 109 with their complemental recesses 82 to thus lock the gear 65 to the driven shaft 20 which is in constant meshing engagement with cluster gear 59 and idler gear 60 whereby this torque-transmitting connection is effective to transmit drive torque from the driving gear 17, cluster gears 18 and 59 to gear 65 thence to the output shaft 20 in a reverse rotational direction to that of the driving shaft to correspondingly drive the vehicle propeller shaft (not shown) for reverse driving of the vehicle.

During this engaging sequence of the reverse drive, it should be importantly noted that the positioning detents 123 disengage from the depressions 119 carried on the locking segments 103 and engage with the depressions 120 carried thereon to releasably lock thereon the set of clutch elements 109 and gear connected sleeve member 141 in their respective drive activated positions in the same manner as the previously described detent elements 123 cooperate with the depressions 119, 120 in locking segments on each pair of diametrically disposed clutch elements in sets 101, 102.

This completes what may be termed a reverse driving cycle of activating the reverse drive from neutral position shown in FIGURE 1. To deactivate the reverse drive, the slidable member 148 is returned to its neutral position wherein left end of said member again abuts the gear 64 and which movement rotates the sleeve member 141 counterclockwise to present the unlocking portions 104 on an imaginary circle wherein the locking segments 103 are disengaged from their cooperating recesses 82 and the positioning detents 123 again engage the depressions 119 to releasably stabilize the set of clutch elements 109 and gear connected sleeve member 141 in their respective neutral positions shown in FIGURE 1 in readiness for another activation of reverse drive when desired.

Reference is now made to the novel splined connections 93, 139 between the slidable member 125 and the interlocking member 90 and between projection 153 and one of the stems 106 of one of the clutch elements 109 between the slidable member 148 and driven shaft 20. These connections accommodate relative sliding movement of the slidable members with respect to the driven shaft 20 and therefore maintain co-rotational movement thereof.

Referring now to the function of the interlocking mechanism IM, the slidable sleeve 192 which carries the spring-pressed-apart balls 194, 195 into releasably engaging relation with respect to the notches 181, 182 and 183 carried by the flange 189 on the crank 171, and the notches 186, 187 carried by the flange 185 on the crank 177, respectively, it is seen that the function of the ball-notch engagement is to releasably position the shifting forks 172, 178 and connected slidable members 125, 148 respectively in their neutral and drive activating (operating) positions fully described above, while the sleeve 192 performs an entirely different function of locking one shifting fork in neutral position while the other shifting fork is in a drive activating position to prevent simultaneous engagement of two drives therefore damage to the transmission T. This locking of one shifting fork while the other shifting fork is being moved to its drive activating positions from neutral, is accomplished by the flats on opposite sides of the notches 182 and 186 when aligned with the sleeve 192 wherein slight lost-motion is provided between the sleeve 192 and flats carried by the flanges 180, 185, but when an arcuate interconnecting portion between said notches on one of the flanges is presented to one end of said sleeve member 192 the latter is forced snugly against the flats adjacent opposite sides of the neutral notch on the other flange to lock it in said neutral position thus preventing engaging movement of the clutch elements controlled by that shiftable member connected to said neutral position flange. In this manner, when either one of the forward driving speeds is active, the reverse drive is positively locked in neutral position shown in FIGURE 1 and when reverse drive is active the sleeve 192 and cooperating flats and arcuate portions on the two flanges aforesaid posiitvely lock the low-speed and direct-drive in their respective neutral non-driving positions shown in FIGURE 1.

The present novel positive clutch means having elements rotatably engageable to lockup two relatively rotatable members, may accomplish such lockup action in either direction of rotation relatively to the illustrated driven shaft 20. This locking action is characterized by a self-synchronizing action between the locking segments 103 and cooperating recesses aforesaid in that the leading edges which preferably carry a slight radius on the interconnecting lands between the said recesses, pass in front of the leading edges which also carry a radius on the locking segments 103 provide an engaging interval from the point at which the leading terminating edges on the locking segments enter their respective recesses. Continued manual or engaging pressure on said clutch elements enables the locking segments to rotate relatively to the recesses presented for engagement thereby in front of the rear leading edges thereof to establish immediate contact between the cylindrical surfaces on the locking segments and complemental arcuate surfaces defining the said recesses whereby continued relative rotational movement of the locking segments presents a fully engaged relation thereof with the said recesses to complete lockup therebetween. In sharp contrast to prior art interengageable positive elements, the present novel engaging action between relatively rotatable positive elements provides entry of the locking segments into the leading edge portions of the recesses to bring about substantial synchronous rotational relation between the members to be locked together with completed engagement thereof subsequently effected by continued actuating pressure on said sleeve members and gear connected clutch elements aforesaid. Either of the opposite points of mergence between the locking segments and unlocking portions on the clutch elements, may be the leading edge depending on the direction of engaging rotation imparted to said clutch elements. That is, if clockwise rotation is utilized to engage the clutch elements with their cooperative recesses, the leading edge and trailing edge would follow in that order but if a counterclockwise movement is given the said clutch elements the sequence of said edges would be reversed. Thus, in either direction of rotation of the clutch elements the leading edge is followed by the trailing edge.

To facilitate the aforesaid novel engaging action, the invention contemplates that the arcuate contour of the recesses may be formed with a radius different from the radius defining the locking segments aforesaid. Stated differently, the locking segments do not necessarily have to be provided with a circular contour identical to the contour defining the said recesses while the arcuate contours of the unlocking face portions 104 on each of the clutch elements must define a true circle when disengaged from said recesses. Accordingly, the locking segments and cooperating recesses engageable thereby may be formed with various cooperating contours to achieve the novel engaging coaction herein contemplated.

Other features of construction of the present apparatus should be observed by referring to the preferably sleeved central holes in the gears 64, 65. Also the continuous engagement of the sleeve members 111 and 112, and 141 through the novel gear arrangement with the gear segments carried on each of the rotatable clutch elements insures that each set of clutch elements rotates simultaneously in properly timed relation to the engaging sequence shown in FIGURES 8, 9 and 10. The carriers 34, 35 and 42 for these sets of clutch elements may be fabricated of hardened steel to insure strength and long service life, and since they are readily assembled on the driven shaft 20, the assembly of the transmission mechanism as a whole is greatly facilitated along with lower cost of manufacture of the parts.

The cutout 143 in the left end of the sleeve member 141 is of such arcuate length so as to enable relative rotational movement of said member through the arc necessary to rotate the clutch elements 109 from fully unlocked positions to fully locked positions as shown in FIGURES 8 and 10 respectively. Accordingly, the projection 153 does not interfere with the free rotational movement of the sleeve member 141 to its two operating positions.

It is thus seen that the aforesaid novel torque-transmitting connections provide highly advantageous operating characteristics to smoothly and noiselessly effect gear ratio transition to produce different driving condition in the present novel torque-changing mechanism T, that the drive mechanism is economical of manufacture and of simple construction requiring no special manufacturing operations, and thus suitable to mass production and use in motor vehicles and the like, particularly the smaller cars as distinguished from present production automobiles of heavier and larger proportions.

With reference to the terminology used in the foregoing description and in the appended claims, the identifying expressions and/or terms are intended to convey meanings which include the range of reasonable equivalents in the patent sense. For example, "automatic transmission," "automatic drive," "change-speed transmission," "torque-changing drive or mechanism," "power train," "power transmission," "transmission," "variable-drive unit," are intended to include any type of coupling means between the prime mover and driving shaft 15, while the drive-mechanism within the gearbox 11 may comprise either planetary and/or sliding gearing to produce the said gear-sets in which the present novel positive clutch means are incorporated or some other selective drive-mechanism serving the same purpose. All directional terms and characters such as "front," "forward," "rearward," "left," "right," "bottom," "top," etc., except those designating the direction of motion of the associated vehicle, are intended to have only relative connotation for convenience in describing the structure as illustrated in the drawing, and are not intended to be interpreted as requiring any particular orientation with respect to associate structure external to the present disclosure.

The preferred embodiment has been illustrated and described and is believed well calculated to fulfill the objects stated above. However, it is obvious that various modifications, variations, changes and substitutions may be made in the illustrated arrangement of the cooperating elements constituting the invention without departing from the proper scope or fair meaning of the subjoined claims.

Having thus described my invention, I claim:

1. In a power transmission; a driving shaft, a driven shaft, one of said shafts being provided with a recess, a rotatable clutch element carried by the other shaft in radially spaced parallel relation with respect to the axis thereof, a complemental locking segment on said clutch element rotatable therewith into engagement with said recess to lock said shafts to rotate as a unit, a gear segment on said clutch element, a rotatable member having a portion defined by gear teeth in constant meshing engagement with said gear segment to effect relative rotation of the locking segment on said clutch element into and out of engagement with said recess, an actuatable member slidably mounted on said rotatable member for co-rotation with said other shaft, means interconnecting said rotatable and actuatable members for converting sliding movement of said actuatable member into rotational movement of said rotatable member, and means for actuating said actuatable member.

2. In a power transmission; a driving shaft terminating at one end into a circular flange having a hollow cylindrical wall normal thereto, a plurality of recesses circumferentially spaced by interconnecting lands lying on a circle defining the inner surface of the hollow wall, a driven shaft, a plurality of rotatable clutch elements carried by said driven shaft in radially spaced parallel relation with respect to the axis thereof, a complemental locking segment on each of said clutch elements rotatable therewith into engagement with a like number of said recesses to lock said shafts to rotate as a unit, an arcuate surface on each of said clutch elements in circular alignment with said locking segments and lying on an imaginary circle of slightly less diameter than the circle which defines the arcuate surfaces of the interconnecting lands aforesaid whereby said locking segments are disengaged from their complemental recesses to unlock said shafts, a gear segment on each of said clutch elements, a rotatable member having a gear segment in constant meshing relation with the first-named gear segments to impart relative rotation therebetween, an actuatable member slidably mounted on said rotatable member for co-rotation with said driven shaft, means interconnecting said rotatable and actuatable members for converting sliding movement of said actuatable member into rotational movement of said rotatable member, and means for actuating said actuatable member.

3. In variable-drive gear transmissions and control mechanism therefor, said transmission comprising at least two different establishable gearset drives; a driving shaft; a driven shaft coaxial with respect to said driving shaft; a first gear fast on said driving shaft, sleeve integral with said first gear; a plurality of recesses interconnected by arcuate lands defining the inner surface of said sleeve; a second gear rotatably mounted on said driven shaft in longitudinally spaced relation with respect to said first-named gear, a sleeve integral with said second gear and disposed in confronting relation with respect to said first-named sleeve; a plurality of recesses interconnected by arcuate lands defining the inner surface of said last-named sleeve; a countershaft; a third gear fast on said countershaft in constant meshing relation with said first-named gear; a fourth gear fast on said countershaft in constant meshing relation with said second gear; a circular flange carried by said driven shaft and medially disposed with respect to the confronting sleeves on said first and second gears respectively; a plurality of longitudinal bores through said flange radially spaced in parallel relation with respect to the axis of said driven shaft; a counterbore terminating opposite ends of each of said longitudinal bores; a longitudinal opening through the wall of each of said counterbores communicating with the exterior of said flange; an external annular groove medially disposed with respect to said flange; a ring-like interlocking member formed by a pair of semicircular sections engaging said annular groove; a pair of diametrically disposed splines, one on the outer face of each of said semicircular sections; a pair of diametrically disposed holes, one through each semicircular section; a pair of coaxial clutch elements each having a stem portion projecting through each of said longitudinal bores and said holes in said interlocking member in abutting relation for rotating simultaneously and relatively with respect to said driven shaft; a gear segment on each of said clutch elements exposed through the longitudinal openings in said counterbores; a locking segment terminating each of the opposite ends of said clutch elements adjacent the gear segments thereon, said locking segments having an arcuate contour defining an imaginary circle of slightly less diameter than a similar circle defining the arcuate contour of said recess interconnecting lands wherein said clutch elements are disengaged from their complemental recesses to establish neutral condition of said variable-drive; a pair of diametrically disposed indentations in the exterior faces of the semicircular sections of the interlocking member; a pair of diametrically disposed detent holes through the semicircular sections of said interlocking member; a pair of rotatable sleeves, one being disposed between the sleeve on the first-named gear and interlocking member and the other being disposed between the sleeve on the second-named gear and opposite side of said interlocking member; an internal gear terminating each of the opposed ends of said rotatable sleeves, said internal gear being disposed in circular alignment with the gear segments on each of said clutch elements in constant meshing relation therewith whereby rotation of said rotatable sleeve imparts relative rotation to said clutch elements; an actuatable member slidably disposed on said rotatable sleeves and having a splined connection with said splines projecting from said interlocking member whereby said actuatable member is rotatable with and slidable relatively to said driven shaft; two pairs of diametrically disposed surface grooves radiating in opposite directions on said rotatable sleeves, one from each end of the aforesaid indentations in said interlocking member, at an angle to a horizontal plane through the axis of said driven shaft; an element carried by said actuatable member normally engaging the indentations and terminating adjacent portions of each of said surface grooves to establish and maintain said rotatable sleeves and clutch elements carried thereby disengaged from the recesses carried by the first and second gears aforesaid; a movable element carried in each of the said detent holes; a pair of confronting depressions, one in each confronting end of said rotatable sleeves, normally in alignment with said detent holes when said locking segments on the clutch elements are disengaged from their complemental recesses, said movable element partially engaging said depressions; and means for actuating said actuatable member whereby the element carried thereby slidably engages the grooves carried by the selected rotatable sleeve to rotate the latter thereby effecting relative rotation of the clutch elements geared to such selected rotatable sleeve to engage the locking segments of said clutch elements in a like number of recesses to establish the selected gear drive, and wherein the depression in the rotated sleeve forces the detent element into the depression in the other sleeve to hold the latter stationary thereby preventing the simultaneous establishment of two different gear drives.

4. In change-speed gear two-way drives; a driving shaft; a driven shaft; a countershaft; three constantly meshed gearsets for connecting said shafts in variant relative driving speed relation and including an element slidable from a neutral position into first and second drive positions to establish a first speed forward drive and a second speed forward drive respectively, and another element slidable from a neutral position to a reverse drive position to establish a reverse drive; means for selectively sliding said elements to their neutral and drive positions; a clutch member fast on said driving shaft and provided with a cylindrical sleeve having a plurality of recesses interconnected by arcuate lands defining the inner surface of said sleeve; a plurality of clutch elements rotatably carried by said driven shaft in radially spaced relation with respect to the axis thereof; a locking segment on each of said clutch elements in circular alignment with said recesses and engageable therewith to establish first speed forward drive; a gear segment on each of said clutch elements; an other clutch member incorporated in one of said gearsets and provided with a cylindrical sleeve having a plurality of recesses interconnected by arcuate lands defining the inner surface of said last-named sleeve; another like number of clutch elements rotatably carried by said driven shaft in coaxial disposition with respect to said first-named plurality of clutch elements; a locking segment on each of said other plurality of clutch elements in circular alignment with the recesses in the clutch member incorporated in one of said gearsets to establish second speed forward drive when engaged; a gear segment on each of said other plurality of clutch elements; means interconnecting said slidable elements with said driven shaft to accommodate relative sliding movement only of said slidable elements with respect to said driven shaft; positive interlocking means carried by said driven shaft between confronting ends of said cylindrical sleeves to prevent simultaneous rotation thereof; combined positive and yieldable detent means incorporated between said slidable elements for releasably establishing said slidable elements in their different operating positions and to prevent simultaneous movement of both of said slidable elements from their respective neutral positions; an internal gear carried on the opposed ends of said cylindrical sleeves in constant meshing relation with the gear segments on said first-named plurality of clutch elements and said second-named plurality of clutch elements to impart relative rotation to said clutch elements when said sleeves are rotated; a pair of diametrically opposed ball and angular raceway connecting means incorporated between the slidable element having a neutral and first and second drive position, and said cylindrical sleeves to convert sliding movement of said slidable element from neutral position into rotary movement of one or the other of said cylindrical sleeves to rotate the selected plurality of clutch elements to engage their locking segments with their complemental recesses to selectively establish the said first and second speed forward drives; a third clutch member incorporated in another of said gearsets and provided with a cylindrical sleeve having a plurality of recesses interconnected by arcuate lands defining the inner surface of said sleeve; a third plurality of clutch elements rotatably carried by said driven shaft in radially spaced relation with respect to the axis thereof; a locking segment on each of said clutch elements in circular alignment with the recesses in said third clutch member and engageable therewith to establish reverse drive; a gear segment on each of said third plurality of clutch elements; an internal gear on one end of the cylindrical sleeve incorporated in the third clutch member in constant meshing relation with the gear segments on the third plurality of clutch elements to rotate the latter; and a pair of diametrically opposed ball and angular raceway connecting means incorporated between the slidable element having a neutral and reverse drive position, and the cylindrical sleeve incorporated in said third clutch member to convert sliding movement thereof into rotary movement of the last-named cylindrical sleeve to rotate the third plurality of clutch elements to engage their locking segments in their complemental recesses to establish said reverse drive.

5. A torque-changing positive drive mechanism contained in a housing, comprising: a driving shaft, a driven shaft, a countershaft, a gear fast on said driving shaft; a first gear fast on said countershaft in constant meshing relation with said first-named gear; a gear rotatably mounted on said driven shaft; a second gear fast on said countershaft in constant meshing relation with said rotatable gear to provide a low speed forward drive gearset; a torque-transmitting connection between said first-named gear and said driven shaft to provide direct-drive between said driving and driven shafts, said torque-transmitting connection including a plurality of circumferentially spaced recesses radially positioned from the axis of said driving shaft in said first-named gear, a plurality of rotatable clutch elements journaled on said driven shaft in radially spaced parallel relation with respect to the axis thereof to rotate with and relatively to said driven shaft, a locking segment on each of said clutch elements in circular alignment with said recesses for engagement therewith upon relative rotation of said clutch elements, a gear segment on each of said clutch elements, and a cylindrical sleeve encircling said clutch elements and having an internal gear in constant meshing relation with the gear segments on said clutch elements to effect relative rotation of the latter; a second torque-transmitting connection between said rotatable gear and said driven shaft, said torque-transmitting connection including a plurality of circumferentially spaced recesses radially positioned from the axis of said driven shaft in said rotatable gear, a plurality of rotatable clutch elements journaled on said driven shaft in radially spaced parallel relation with respect to the axis of said driven shaft, a locking segment on each of said clutch elements in circular alignment with said recesses in the rotatable gear for engagement therewith upon relative rotation of said clutch elements, and a cylindrical sleeve encircling said last-named clutch elements and having an internal gear in constant meshing relation with the last-named gear segments to effect relative rotation of the latter independently of the first-named clutch elements; a second gear rotatably mounted on said driven shaft; a third gear fast on said countershaft in constant meshing relation with the second rotatable gear; an idler gear constantly meshed with said third gear and second rotatable gear to provide a reverse drive; a third torque-transmitting connection between said second rotatable gear and said driven shaft, said torque-transmitting connection including a plurality of circumferentially spaced recesses radially positioned from the axis of said driven shaft in said second rotatable gear, a plurality of rotatable clutch elements journaled on said driven shaft in radially spaced parallel relation with respect to the axis of said driven shaft, a locking segment on each of said clutch elements in circular alignment with said recesses in the second rotatable gear for engagement therewith upon relative rotation of said clutch elements, and a cylindrical sleeve encircling said last-named clutch elements and having an internal gear in constant meshing relation with the gear segments on said second rotatable gear clutch elements to effect relative rotation of the latter; a collar provided with an external annular groove slidably mounted on and medially disposed normally with respect to the cylindrical sleeves for controlling low speed forward drive and direct-drive; a ball and raceway connection between said collar and sleeves for converting sliding movement of said collar in opposite directions from its medial position into rotary movement of said sleeves to selectively engage the locking segments with their complemental recesses carried by the first-named gear and the first-named rotatable gear respectively to selectively establish low speed and direct-drive respectively; positive interlocking means incorporated between the two sleeves controlling low speed drive and direct-drive; a second collar provided with an external annular groove slidably mounted on the sleeve for controlling reverse drive and normally in neutral position; a second ball and raceway connection between said second collar and last-named sleeve for converting sliding movement of said collar from its neutral position in one direction into rotary movement of said last-named sleeve to engage the locking segments with their complemental recesses carried by said second rotatable gear to establish reverse drive; a pair of shifting forks journaled on the housing of said mechanism, each engaging one of the annular grooves of each of said collars whereby the latter are slidably moved to their different drive establishing positions aforesaid; yieldable detent means carried by the housing for releasably establishing each of said shifting forks and connected collars in their different drive positions aforesaid; a second positive interlocking mechanism carried by the housing between said shifting forks for locking one of said forks in neutral position while the other fork is in a drive establishing position; and means for selectively actuating said shifting forks.

6. In torque-changing mechanism having two coaxially disposed relatively rotatable members, comprising: complemental positively engageable clutch elements carried respectively by said members and normally disengaged to unlock said members for relative rotation with respect to each other, the axis of one of said clutch elements being radially spaced parallelly to the axis of one of said members for relative and simultaneous rotation therewith when said one clutch element is engaging or disengaging its complemental clutch element carried by the other member; means for positively rotating said one clutch element into engaged and disengaged relation with respect to the other clutch element carried by said other member to lock and unlock said members respectively; and actuating means including a slidable element to effect rotation of said rotatable means.

7. In torque-changing mechanism having two coaxially disposed relatively rotatable members, comprising: complemental positively engageable clutch elements carried respectively by said members and normally disengaged to unlock said members for relative rotation with respect to each other, the axis of one of said clutch elements being radially spaced parallelly to the axis of one of said members for relative and simultaneous rotation when said one clutch element is engaging or disengaging its complemental clutch element carried by the other member; means for positively rotating said one clutch element into engaged and disengaged relation with respect to its complemental clutch element carried by the other member to lock and unlock said members respectively; a spring-loaded detent element carried by said one member selectively engageable in a pair of complemental depressions formed in the outer surface of said one clutch element to releasably stabilize said one clutch element in its engaged or disengaged position aforesaid; and actuating means including a slidable element coaxially disposed with respect to said one member to effect rotation of said rotatable means.

8. A torque-changing mechanism having a pair of coaxially disposed relatively rotatable members, and a third rotatable member parallelly spaced from said pair of members and continuously interconnected respectively therewith by a pair of spaced gearsets to provide two two-way drives of different ratios, comprising: complemental positively engageable clutch elements incorporated in one of said gearsets and normally disengaged to unlock said pair of members for relative rotation with respect to each other, the axis of one of said clutch elements being radially spaced parallelly to the axis of one of said pair of members for relative and simultaneous rotation when said one clutch element is engaging and disengaging its complemental clutch element carried by the one gearset; another complemental positively engageable clutch element incorporated in the other gearset and normally disengaged to unlock said pair of members for relative rotation with respect to each other, the axis of one of said other clutch elements and said one of said pair of members being parallelly spaced for relative and simultaneous rotation when said other clutch element is engaging or disengaging its complemental clutch element carried by said other gearset; means including two relatively rotatable elements for selectively rotating said one and other clutch elements into engaged and disengaged relation with respect to their respective complemental clutch elements carried respectively by the said two gearsets; positive interlocking means including a movable element carried by said one of the pair of members between said two relatively rotatable elements of the means for rotating said one and other clutch elements, to lock the inactive rotatable element in neutral-disengaged relation with respect to its complemental clutch element while the other clutch element is rotated into engaged relation with respect to its complemental clutch element to establish the selected drive; and means including a slidable element telescopically disposed on said rotatable elements for selectively rotating the latter to effect rotation of said one and other clutch elements.

9. In positive clutch mechanism: two coaxially disposed relatively rotatable members; complemental positively engageable clutch elements carried respectively by said members in circularly aligned relation, one of said clutch elements having two operating positions of disengagement and engagement respectively with respect to the other clutch element, and rotatable on an axis parallelly spaced from the axis of said one member for relative and simultaneous rotation therewith while said one clutch element is being selectively rotated to either of its two operating positions; means for positively rotating said one clutch element into engaged and disengaged relation with respect to its complemental clutch element carried by the other member to lock and unlock said members respectively; yieldable detent means including an element adapted to react on said one clutch element to releasably stabilize the same in either of its two operating positions; and actuating means including a slidable element concentrically positioned in encircling relation with respect to said one member to effect rotation of said rotatable means.

References Cited in the file of this patent
UNITED STATES PATENTS

| 1,546,672 | Peacock | July 21, 1925 |
| 1,757,027 | Tuttle | May 6, 1930 |
| 1,798,928 | Campbell | Mar. 31, 1931 |
| 2,195,410 | Fraser | Apr. 2, 1940 |
| 2,221,199 | Peo et al. | Nov. 12, 1940 |
| 2,961,986 | Rockhill | Nov. 29, 1960 |